United States Patent
Delo et al.

(10) Patent No.: US 6,370,686 B1
(45) Date of Patent: Apr. 9, 2002

(54) METHOD FOR CATEGORIZING AND INSTALLING SELECTED SOFTWARE COMPONENTS

(75) Inventors: John C. Delo, Bellevue; Malcolm S. Haar; Jeffrey E. Larsson, both of Seattle; Chetan A. Parulekar, Redmond, all of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/157,695

(22) Filed: Sep. 21, 1998

(51) Int. Cl.⁷ .............................................. G06F 9/445
(52) U.S. Cl. ...................................................... 717/11
(58) Field of Search ........................... 395/712; 717/11; 707/3, 6

(56) References Cited

U.S. PATENT DOCUMENTS

| | | | | |
|---|---|---|---|---|
| 5,291,593 A | * | 3/1994 | Abraham et al. | 395/600 |
| 5,845,077 A | * | 12/1998 | Fawcett | 395/200.51 |
| 5,953,533 A | * | 9/1999 | Fink et al. | 395/712 |
| 5,963,743 A | * | 10/1999 | Amberg et al. | 395/712 |
| 5,995,757 A | * | 11/1999 | Amberg et al. | 395/712 |
| 6,006,034 A | * | 12/1999 | Heath et al. | 395/712 |

OTHER PUBLICATIONS

Kelly, M., "Gain Control of Application Setup and Maintenance with the New Windows Installer", Microsoft Systems Journal: Sep. 1998, pp. 15–27.

* cited by examiner

Primary Examiner—Mark R. Powell
Assistant Examiner—Wei Zhen
(74) Attorney, Agent, or Firm—Michalik & Wylie, PLLC (57) ABSTRACT

A generic way of publishing globally available functionality that can be shared across applications. Utilizing an Installer Registry, an Installer, Descriptors and a Publish Component Table, related components can be retrieved using an qualifier. A request for a listing of related components, which includes a qualifier, is received from an application. The installer retrieves all the related components, matching the qualifier, from the Publish Component Table. The installer then retrieves the features associated with the components and presents the list of components to the application. The application then selects a specific component and the installer then determines the product associated with the selected component by using the feature and component information retrieved from the Publish Component Table. Once the product information is retrieved, the present invention searches the Installer Registry, using the product, feature and component information as a token, and returns a keypath for that token. If the keypath does not exist, the Installer installs the feature and associated component and then returns the keypath of the installed component.

22 Claims, 5 Drawing Sheets

METHOD FOR CATEGORIZING AND INSTALLING SELECTED SOFTWARE COMPONENTS

RELATED APPLICATIONS

This application is related to the following applications, all of which are filed on the same day and assigned to the same assignee as the present application: "Use of Relational Databases for Software Installation"—Ser. No. 09/158,125 now U.S. Pat. No. 6,237,144; "System and Method for Repairing a Damaged Application"—Ser. No. 09/158,126; "Method and System for Restoring a Computer to its Original State After an Unsuccessful Installation Attempt"—Ser. No. 09/158,124; "A System and Method for Managing Locations of Software Components Via A Source List"—Ser. No. 09/157,974, U.S. Pat. No. 6,269,377; "Method for Optimizing the Installation of a Software product onto a Target Computer System"—Ser. No. 09/157,853; "Software Installation and Validation Using Custom Actions"—Ser. No. 09/157,776; "Internal Database Validation"—Ser. No. 09/157,818; "Management of Non-persistent Data in a Persistent Database"—Ser. No. 09/157,833; "Method and System for Advertising Applications"—Ser. No. 09/158,967; "Software Implementation Installer Mechanism"—Ser. No. 09/158,021;

TECHNICAL FIELD

The present invention relates to installing software components and presenting the location of these components to a requesting application, and more particularly, to categorizing, accessing and installing components and sending the location of a selected component to a requesting application.

BACKGROUND OF THE INVENTION

Software modules need to be installed in a computer system before they can be used by an application program or the computer's operating system. Because of the size of current programs, software developers often do not ship their software product in an executable format. This is the case because the executable format typically takes up more space and thus requires additional storage in order to ship the product. It is more efficient to use one of the known various installation techniques that have the effect of compressing the software product in order achieve storage space efficiency.

A software product may comprise "features" and "components." Each software product is made up of one or more features. A feature is a granular piece of the software product that a user may choose to install or execute. Features typically correspond roughly to the functional features of the software product itself. A component is a collection of resources, such as files or registry keys, that are all installed or uninstalled as a unit. Components are the building blocks of the software product that are not exposed to the user.

Once a software product is installed onto a computer system, it may be broken up into several modules or components so that the application or operating system may access only those modules or components that are needed. The location of these several components need to be tracked so that an application or an operating system will know where to access these components. The tracking of these software components is generally performed during the initial installation of the software product. However, after initial installation, the tracking of the component is no longer updated. Therefore, in the instance where the location of the component is overwritten or lost inadvertently, a complete reinstall of the software product needs to be performed in order to retrieve that lost component.

In addition, many software components are related to other software components because of the function they perform. For example, there may be multiple instances of software components related to different languages supported by the user interface. While the user interface language supported by the components is different, the similarity is that all these types of components are related in that they affect the language of the user interface. It is advantageous for application programs or operating systems to categorize related components so that when a need arises for a specific function, such as selecting a user interface language, the application or operating system can access all related components that perform that function quickly. However, as stated above, in the event one of the categorized components can not be found or has been overwritten, then a full reinstall must be performed for the software product in order to retrieve that component.

Therefore, there exists a need in the art for a program that can categorize related components and, in the event a component cannot be found or is overwritten, then to install only the portions of the software product necessary to retrieve the component.

SUMMARY OF THE INVENTION

The present invention satisfies the above described need by providing a method to categorize related components, detect whether the component is installed and to install the component in the event it is not installed. The present invention creates an additional field to attach to the component providing a way to categorize related components. In addition, the present invention utilizes an Installer Registry to track the location of installed components. In the event the component has not been installed, the present invention will install the smallest installable unit possible in order that the component can then be accessible by the application.

Categorizing and installing a component on demand is beneficial for several reasons. First, by categorizing components, an application or other process may request all related components by using a qualifier submitted to the installer. This increases the efficiency of the application or process by reducing the number of searches required to find related components.

Second, by breaking up the software product into smaller installable units, the installer can install-on-demand only those smaller installable units that are required by the application or process. This also increases efficiency by not requiring a complete install of a software product when only a component is needed. This prevents the application from having to wait for a complete software product install, and it saves the computer resources by not requiring them to be dedicated to a complete software product install.

In general, the present invention is directed towards a generic way of publishing globally available functionality that can be shared across applications. More specifically, the present invention is used to access categories of components, which may be used by multiple applications, that may or may not require installation. Thus an application can retrieve multiple components belonging to the same category.

Qualified components contain a qualifier, and a category ID, that are used to identify related components. A category ID is a text string, identifying a category, that is established by the installation application. Qualified components use these identifiers to map to real, non-qualified components, hence providing one level of indirection to the component. By using qualified components, an application can request all components related to a specific category, such as file conversion types or languages supported by the feature. The present invention will also detect whether the component is installed and if not, will install the feature having the component. Whether the component is installed or not by the present invention, a keypath, indicating where the component is located, is returned to the application.

To perform the present invention, an Installer, an Installation Registry, Descriptors and a Publish Component table are utilized. The Installation Registry contains a listing of the products, associated features and components used by the features. In the case where the component is installed, the registry will contain a keypath designating the location of where the component is located. Descriptors are structures containing a product, feature and component information. This information is used to generate a token located in the Installer Registry. The Publish Component Table contains a qualifier, a feature and a category field. In addition, the Publish Component Table may contain an AppData field. The category field is a string that identifies the category of the component being qualified. The feature and category fields provide the information for installing the component referred to by this qualifier. Both feature and component fields are necessary because it is the feature that owns the component that must be installed, a component cannot be installed by itself. When used, the AppData field may contain a descriptive string used to further describe the component.

DETAILED DESCRIPTION OF THE INVENTION

The present invention utilizes an Installer Registry, an Installer, Descriptors and a Publish Component Table. Components that are related can be retrieved by using a category ID, established by the installation application, which identifies the related components. An application may request a list of related components by the use of the category ID. This request may be performed by using the MsiEnumComponentQualifiers Application Programming Interface (API), discussed, with FIGS. 3 and 4 below, in more detail.

The Publish Component Table is populated by a product's author during the product's development. The information contained in the Publish Component Table is transferred to the Installer during the installation or "advertisement" of the product. The Installer, using the information transferred from the Publish Component Table, retrieves all the related components and presents them to the application. Note that the presentation of the related components may include information contained within the AppData. During this retrieval, the Installer records the features associated with the retrieved components. The application then selects one of the components from the list presented by the installer. This selection may be performed by using the MsiProvideQualifiedComponent API discussed, with FIGS. 3 and 4 below, in more detail. Receiving the selection, the Installer determines the product associated with the component by using the feature and component information retrieved from the Publish Component Table. Once the product information is retrieved, the present invention searches the Installer Registry, using the product, feature and component information as a token, and determines whether a keypath exists for that token.

If the keypath for the token exists, then this keypath is returned to the application. If the keypath for the token does not exist, then the Installer installs the feature, and the associated component, and places the keypath, indicating where the component was installed, in the Installer Registry. This keypath is then returned to the application.

EXEMPLARY OPERATING ENVIRONMENT

Figure 1:
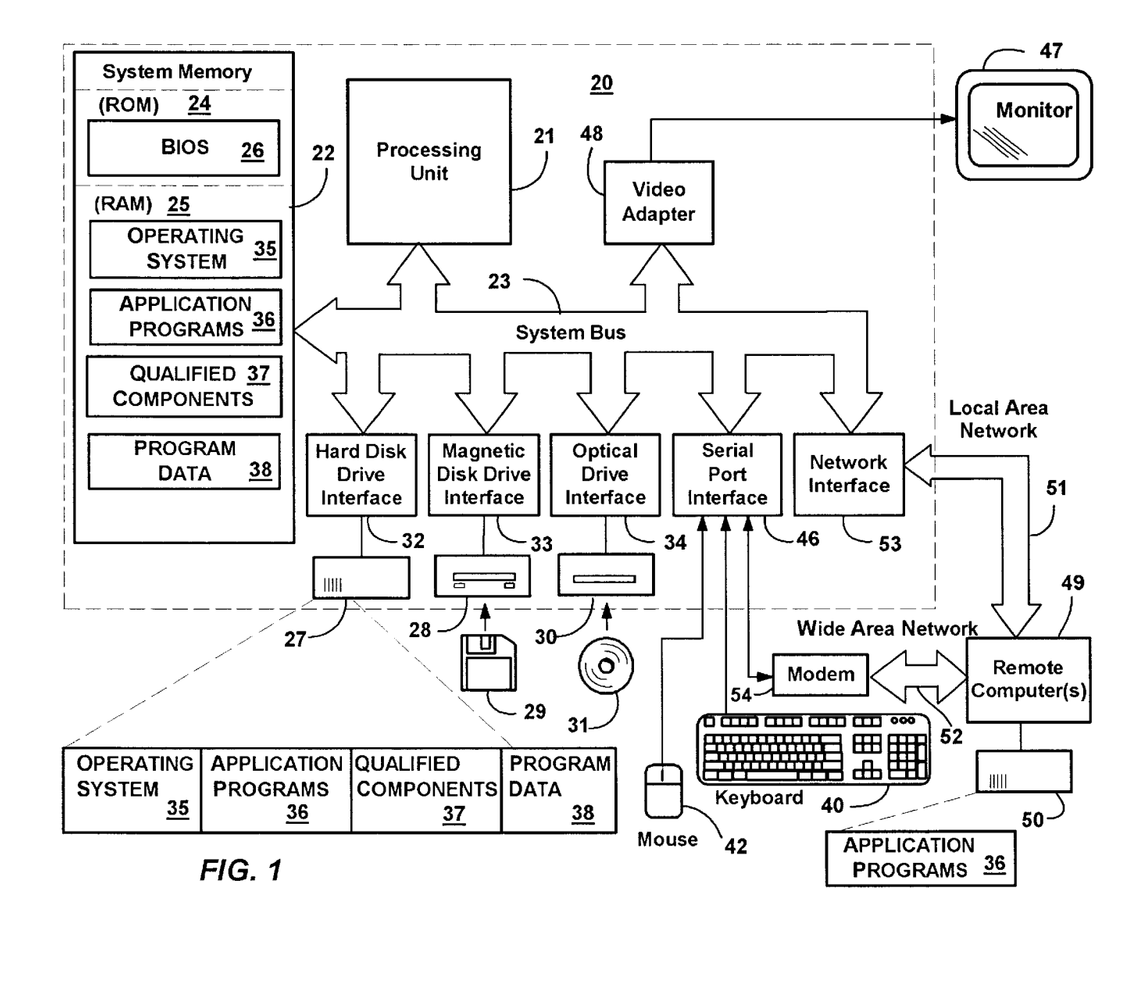
FIG. 1 is a block diagram of a personal computer that provides the operating environment for an embodiment of the present invention.

FIG. 1 and the following discussion are intended to provide a brief, general description of a suitable computing environment in which the invention may be implemented. While the invention will be described in the general context of an application program that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical disk interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 36, qualified components 37, and program data 38. A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

DISCUSSION OF TERMINOLOGY

Figure 2:
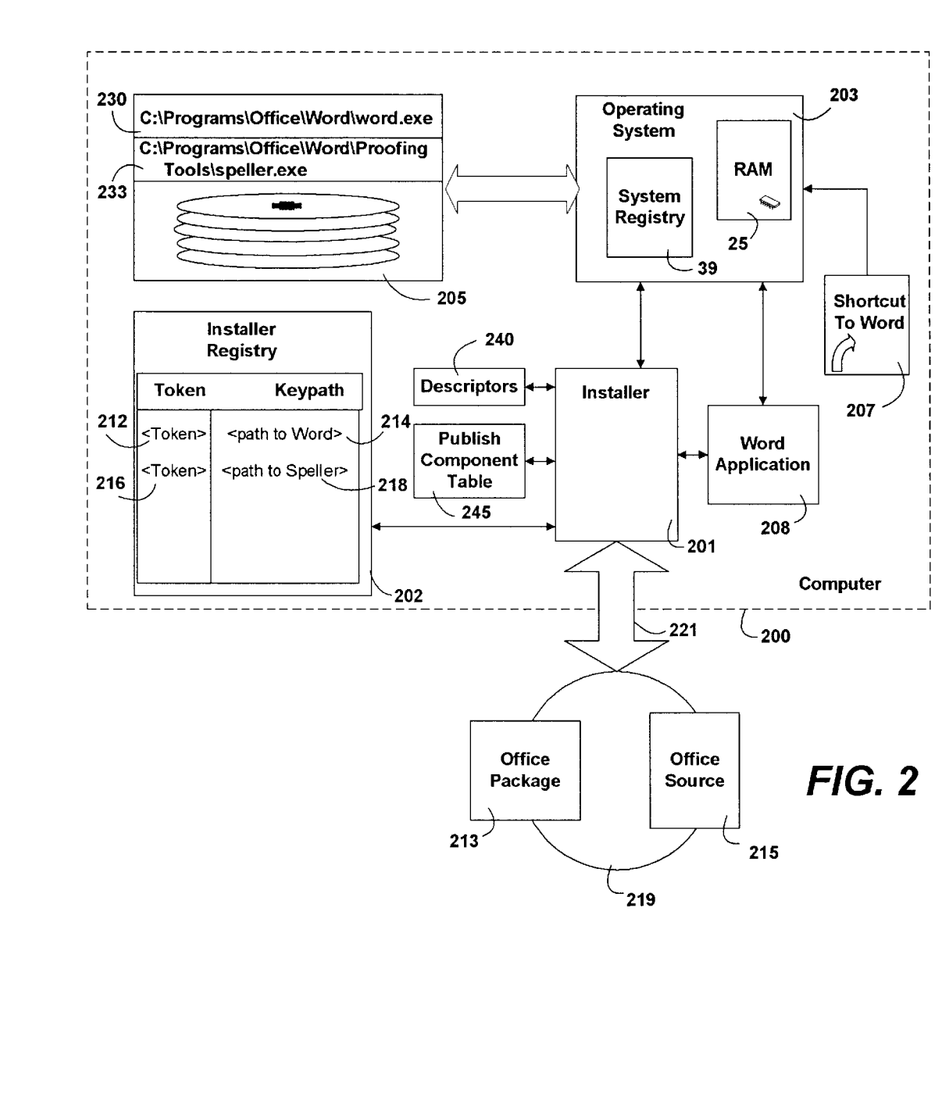
FIG. 2 is a block diagram of the software installation components providing the environment for an embodiment of the present invention.

Before discussing FIG. 2, a brief discussion of terminology is needed. In accordance with an exemplary embodiment of the present invention, the installer application 201 recognizes three principal elements: products, features and components. The installer 201 is also described in co-pending application Ser. No. 09/158,125, entitled "Use of Relational Databases for Software Installation", which is assigned to the same assignee and filed on the same day as the present invention, and incorporated by reference herein. A "product" represents a single, entire application program, such as the Microsoft Office application program marketed by Microsoft Corporation of Redmond, Wash. Each product has a globally unique identifier known as a Product Code which allows products to be distinguished. Each product is made up of one or more features. A "feature" is a granular piece of the product that a user may choose to install or execute. Features typically correspond roughly to the functional features of the product itself, such as a "Proofing Tools" feature or a "Word" feature. Each feature is essentially a grouping of components and may also include other features. Features need not be globally unique, and therefore may be identified by any appropriate means, such as with a textual feature identifier.

A "component" is a collection of resources, such as files or registry keys, that are all installed or uninstalled as a unit. Components are the building blocks of the product that are not exposed to the user. A resource, such as a file or a registry key, may be part of only one component. Two components may not share the same resource whether they are part of the same product or parts of different products. Each component has a globally unique identifier known as a Component Code. The component may also include any resource, such as a file or registry key. A keypath is the location of the where the component is stored.

INSTALLATION ENVIRONMENT

FIG. 2 is a functional block diagram of a computer environment making use of an installer application 201 constructed in accordance with an exemplary embodiment of the present invention. A computer 200 is illustrated, such as conventional personal computer 20 (FIG. 1), including the installer application 201, an Installer Registry 202, an operating system 203, a hard-disk drive 205, a "shortcut" 207, Descriptor 240, a Publish Component Table 245, and an executing application 208. Each of those items is described and discussed in greater detail below.

Also illustrated are a package file 213 and a source 215. The package file 213 and the source 215 may reside on a CD-ROM disk 219 accessible to the computer 200 via an optical disk drive 30. The package file 213 and the source 215 may also exist in any other location accessible by the computer 200. The package file 213 and the source 215 are discussed in further detail below. The functionality and construction of the installer application 201 is best described by example, through the installation and execution of a product.

EXAMPLE OF INSTALLATION PROCEDURE

To begin the example, a user initiates the installation of the product, such as the Microsoft Office application program. Initiating the installation may constitute the act of inserting CD-ROM disk 219 in optical disk drive 30, or the act of executing a remote startup script over a network connection, or any other means of initiating the installation. Once the installation is initiated, the installer application 201 assumes control of processing.

The installer application 201 begins the installation by reading the package file 213 into memory, such as RAM 25. The package file 213 is unique to the product and is essentially a database which describes, among other things, the relationships between the features, components, and resources of the product. The package file 213 may include the unique identifiers assigned to each of the features and components of the product.

The installer application 201 reads the package file 213 and uses the information stored within to determine the installation operations that must be performed for the product. For instance, the installer application 201 may display a dialog box which presents the user with the option of selecting which features of the product to install. The user may be presented with the option of selecting a "Word" feature, an "Excel" feature, and a "Proofing Tools" feature.

The user may then select which features to install to the computer 200. As discussed above, a feature is a grouping of components, and the components identify the actual resources to be installed to the computer 200. Accordingly, once the user has selected the desired features of the product, the installer application 201 resolves those features into a listing of components to be installed.

The source 215 contains the actual resources associated with the components. The source 215 may also include a reference table to identify the associations between the resources and the components. Those components making up the selected features are copied from the source 215 to an appropriate location on the computer 200, such as to the hard-disk drive 205 or to a system registry 225 maintained by the operating system 203. As mentioned above, a component is a collection of resources, such as files, shortcuts, or registry keys. Those skilled in the art will recognize that the phrase "reading the component" may actually refer to reading the resources associated with the component. likewise, the phrase "writing the component" may refer to writing the resources associated with the component. However, for simplicity only, this discussion may use the terms reading, writing, or copying components interchangeably with performing those actions on the underlying resources.

The appropriate location for a component on the computer 200 may depend upon the type of resources associated with the component. For instance, if the component includes files, the component may be stored in the file system of the hard-disk drive 205. However, if the component includes registry keys, the component may be stored in the system registry 225. In addition, a component may include both files and registry keys, in which case files are stored in the file system of the hard-disk drive 205 and the registry keys are stored in the system registry 225. If the user identifies a particular location within the file system of the hard-disk drive 205 for a feature, then the installer application 201 will write the files of components associated with that feature to that particular location.

When a component is written to the appropriate location, the installer application 201 creates an entry in the Installer Registry 202 corresponding to the component. The entry includes an identifier for the component, termed a "token," and a keypath for the component. The token includes the Product Code of the product installing the component, the feature identifier of the feature containing the component, and the Component Code of the component. Those skilled in the art may appreciate that a usage counter may be included to identify the number of features requiring a component. For instance, if more than one feature requiring a component is installed, the usage counter may prevent the component from being deleted if only one such feature is uninstalled.

The keypath entry may be a path in the file system where the component is actually stored. For instance, in the disclosed example, the product installed may include a "Word Feature" having a "Word Executable Component." The Word Executable Component may have the key file "word.exe" 230. The Word Feature may also include a "Proofing Tools Feature," which is actually a sub-feature. As mentioned above, a feature may include sub-features. The Proofing Tools Feature may include a "Spelling Component." The Spelling Component may have the key file "speller.exe" 233.

Continuing with the example, the Word Executable Component may be installed to the location on the hard-disk drive 205 identified by the path "C:\Programs\Office\Word\." Accordingly, the word.exe 230 key file is written to that location, and an entry in the Installer Registry 202 includes a token 212 identifying the Word Executable Component and the keypath 214 to the word.exe 230 key file. In similar manner, the Spelling Component may be written to the path "C:\Programs\Office\Word\Proofing Tools\," and an entry in the Installer Registry 202 may be created with a token 216 identifying the Spelling Component, and a keypath 218 to the speller.exe 233 key file.

The installer application 201 continues with the installation process until all of the components making up the selected features are written to the appropriate location on the computer 200. When all of the components are written, installation is complete and the Installer Registry 202 is populated with an entry for each installed component. Each entry includes an identifier for the component (the token) and a keypath identifying the location to which the component is stored. The installer application 201 may also identify a category associated with selected components. The category is a text string that identifies related components. This category and the component compose the Qualified Component. The installer application 201 will store the category and component in the Publish Component Table 245 and store the component, its associated feature and product information as a Descriptor 240.

EXAMPLE OF PRODUCT EXECUTION

The following discussion gives an overview of the functionality of the installer application 201 once the product is installed. To review, the installer application 201 installed the features of the product selected by the user at installation. The components making up those selected features were written to appropriate locations on the computer 200. For instance, a Word Executable Component and a Speller Component were written to the file system of the hard-disk drive 205. As discussed above, installing those components may include writing the key files of those components to a keypath in the file system of the hard-disk drive 205.

Also during installation, a shortcut 207 to the Work Executable Component was created. The shortcut 207 is an operating system 203 service which allows indirect access to a resource stored on the hard-disk drive 205. A shortcut is sometimes referred to as an "alias." The shortcut 207 is generally presented to the user as an icon or file which, when activated, launches an executable file associated with the shortcut 207. In the disclosed example, the shortcut 207 is associated with the Word Executable Component such that activating the shortcut 207 causes the operating system 203 to launch the key file associated with the Word Executable Component, in this case the word.exe 230 executable file.

When the user activates the shortcut 207, the operating system 203 first instantiates a shell or process within which the executable file will execute. In accordance with the disclosed embodiment, the shortcut 207 then queries the installer application 201 for the path to the executable file associated with the shortcut 207, in this case the path to the word.exe 230 executable file. The shortcut 207 may query for the path by passing to the installer application 201 a "Provide_Component" call with a token identifying the Word Executable Component. In response to the Provide_Component call, the installer application 201 queries the Installer Registry 202 for the keypath associated with the token. The installer application 201 then returns the keypath to the shortcut 207, which in turn prompts the operating system 203 to execute the word.exe 230 key file at the location identified by the keypath. As discussed above, the word.exe 230 key file is stored on the hard-disk drive 205 under the folder "C:\Programs\Office\Word\."

The operating system 203 executes the word.exe 230 key file from the location identified by the keypath. The word.exe 230 key file then assumes control of the shell instantiated by the operating system 203. While the word.exe 230 key file is executing, it is referred to as the "Word application" 208. The Word application 208 may then perform a startup procedure and continue loading. For instance, the Word application 208 may issue a series of "Query_Feature_State" calls to the installer application 201 to identify which features of the Word application 208 are installed. In response to such a call, the installer application 201 may query the Installer Registry 202 to identify whether a particular feature of the Word application 208 is installed, and return that information to the Word application 208. The Word application 208 may perform several such calls in order to populate a menu bar or toolbar of the Word application 208. Once the startup procedure is complete, the Word application 208 is available for use by the user.

During operation, the user may select a particular feature of the Word application 208 for activation. For instance, the user may select a "spell check" option from the menu bar or toolbar of the Word application 208. In response to such a selection, the Word application 208 may query the installer application 201 for the path to the component or components necessary to support the feature. For instance, in the disclosed example, a Spelling Component may be necessary to support the feature associated with the "spell check" option of the Word application 208. In that case, when the user selects "spell check," the Word application may pass a "Provide_Component" call to the installer application 201 along with a token identifying the Spelling Component.

In response to the Provide_Component call, the installer application 201 may verify the installed state of the calling feature identified in the token, and provide the keypath to the key file associated with the component identified in the token. In this example, the key file of the Spelling Component is the speller.exe 233 key file. Consequently, when the installer application 201 receives a Provide_Component call with a token identifying the Spelling Component, the installer application 201 queries the Installer Registry 202 for the keypath associated with that token. The installer application 201 then returns the keypath to the Word application 208, which then instructs the operating system 203 to execute the speller.exe 233 key file at the location identified by the keypath. Once the operating system 203 has launched the speller.exe 233 key file, the Speller Component is available to the Word application 208. In this manner, the Word application 208 may query the installer application 201 each time the user attempts to activate another feature, and the installer application 201 returns the keypath for the appropriate component.

The forgoing has been a general overview of the functionality of an installer application 201 which may benefit from an exemplary embodiment of the present invention. The discussion will now explain in greater detail additional inventive aspects of qualified components.

UTILIZING QUALIFIED COMPONENTS

Qualified components provide a means by which an application program can identify a component by a category. This category can be defined in any way the installing application chooses. Preferably, it will be a string that indicates some common function among the other components that share the same category. Having components associated with a category, the application can request related components by identifying the category they belong to. The present invention also includes the process of, once receiving a request from an application for a component, returning the location, i.e., the keypath, of the component and installing the component if it is currently not installed.

Figure 3:
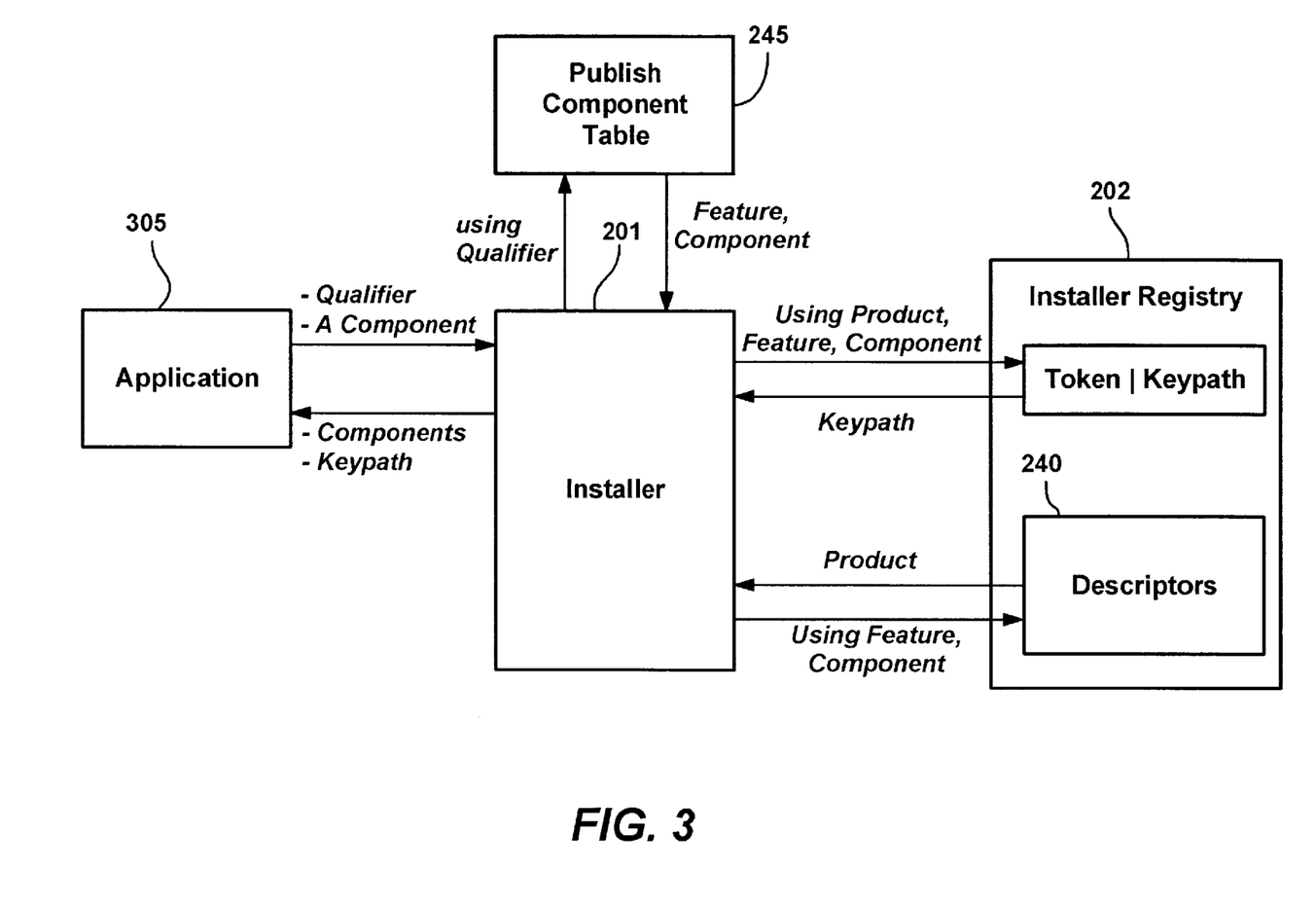
FIG. 3 is a diagram depicting the informational flow between an application, the Installer, the Installer Registry, descriptors, and the Publish Component Table when operating on qualified components in an embodiment of the present invention.

FIG. 3 depicts informational flow between an application, the Installer, the Installer Registry, descriptors, and the Published Component Table. The process of initially installing the components and qualified components and the process of populating the Publish Component Table, Descriptors and Installer Registry has already occurred, as described above for example. In this exemplary embodiment, the application 305 will pass to the Installer 201 a category ID or a component. In the case where it passes a category ID, the Installer searches for a group of components satisfying the category specified in the category ID. In an embodiment of the present invention, this may be performed by the application invoking a MsiEnumComponentQualifiers API. The definition, in an ANSI and UNICODE version, for the MsiEnumComponentQualifiers API is as follows:

In ANSI:

```
UINT WINAPI MsiEnumComponentQualifiersA(
    LPCSTR  szComponent,          // generic component ID
                                   that is qualified
    DWORD   iIndex,                // 0-based index into
                                   qualifiers
    LPSTR   lpQualifierBuf,        // qualifier buffer
    DWORD   *pcchQualifierBuf,     // in/out qualifier buffer
                                   character count
    LPSTR   lpApplicationDataBuf,  // description buffer
    DWORD   *pcchApplicationDatBuf); // in/out description
                                   buffer character count
In UNICODE:
UINT WINAPI MsiEnumComponentQualifiersW(
    LPCWSTR szComponent,           // generic component ID
                                   that is qualified
    DWORD   iIndex,                // 0-based index into
                                   qualifiers
    LPWSTR  lpQualifierBuf,        // qualifier buffer
    DWORD   *pcchQualifierBuf,     // in/out qualifier buffer
                                   character count
    LPWSTR  lpApplicationDataBuf,  // description buffer
    DWORD   *pcchApplicationDataBuf); // in/out description
                                   buffer character count
```

There are several reasons why related components, i.e., those satisfying matching a category ID, are desired. The application may need to choose from available processes to perform a task. In order to make this choice, it is more efficient for the application to choose only from processes capable of performing the task. Therefore, only presenting the relevant processes increases efficiency. Another example is where the application may be presenting options to a user. The user may only want to see related processes, or components, that can perform the desired function. This is the case where the user must select a user interface language. The user will only want to select from the language components available. The user does not need to see components that deal with I/O or other unrelated processes.

In the case where the application 305 passes a component to the installer 201, the Installer will return the keypath, i.e., the location, of the component. This may occur when the application knows what component it desires and now needs the location of where the component is stored. In one embodiment of the present invention, this may be performed by the application invoking the MsiProvideQualifiedComponent API. The definition for the MsiProvideQualifiedComponent API is as follows, again in ANSI and UNICODE versions.

In ANSI:

```
UINT WINAPI MsiProvideQualifiedComponentA(
        LPCSTR  szCategory,        // component category ID
        LPCSTR  szQualifier,       // specifies which component
                                   to access
        DWORD   dwInstallMode,     // either of type
INSTALLMODE
                                   or a combination of the
                                   REINSTALLMODE flags
        LPSTR   lpPathBuf,         // returned path, NULL if not
                                   desired
        DWORD   *pcchPathBuf);     // in/out buffer character count
In UNICODE:
UINT WINAPI MsiProvideQualifiedComponentW(
        LPCWSTR szCategory,        // component category ID
        LPCWSTR szQualifier,       // specifies which component
                                   to access
        DWORD   dwInstallMode,     // either of type
INSTALLMODE
                                   or a combination of the
                                   REINSTALLMODE flags
        LPWSTR  lpPathBuf,         // returned path, NULL if not
                                   desired
        DWORD   *pcchPathBuf);     // in/out buffer character count
```

Therefore, in response to receiving the category ID or the component, the installer will send back to the application 305 either a list of components that match the category specified in the category ID or it will pass back to the application 305, the keypath of the specific component requested by the application.

In the process of returning a list of components, the Installer 201 obtained a feature associated with each of the components in the list. Therefore, when the application 305 responds with a request for a specific component, the Installer 201 will already have the associated feature which it will use to find the component in the Installer Registry 202. This is described in more detail with respect to FIG. 4.

The Descriptors 204 contain product, feature and component information for every qualified component installed by the installer application. The Installer 201, using the feature and component as known entities, will search through the Descriptors 204 to determine the product associated with the known feature and component. Having found the product associated with the feature and component in the Descriptors 204, it receives that product information and associates it with the feature and component already determined.

The Installer 201 also interacts with the Installed Registry 202. As stated above, the Installer Registry contains a token and a keypath. The token will contain product, feature and component information and associate it with a keypath. Using the product feature and component information, the Installer 201 searches the Installer Registry 202 to find the token representing the product, feature and component information and returns the associated keypath to the installer if the keypath exists. This keypath is the location where the component for the associated feature and product is stored in the computer 200. The application 305 will use this keypath to find the component in order that it may execute it. If the keypath does not exist, then the component needs to be reinstalled.

The Installer 201 also interacts with the Published Component Table 245. In one embodiment, the information contained in the Publish Component Table, which was populated by the product's author, is transferred to the Installer during the product's installation or "advertisement." It will be recognized by one skilled in the art that the location of information contained in the Publish Component Table 245 may be read into many other databases or files. However the use of the information contained within the Publish Component Table 245, regardless of how it is be read, either as the table or transferred to another database or file, and its use, either at installation or at runtime, is considered within the scope of the present invention.

The Installer 201, using a category ID passed to it from the application 305, searches, the information transferred from the Published Component Table, for all the components having a category that matches the received category ID. Upon searching the Published Component Table, a feature and an associated component that matches the category specified in the category ID is returned to the Installer 201.

Figure 4:
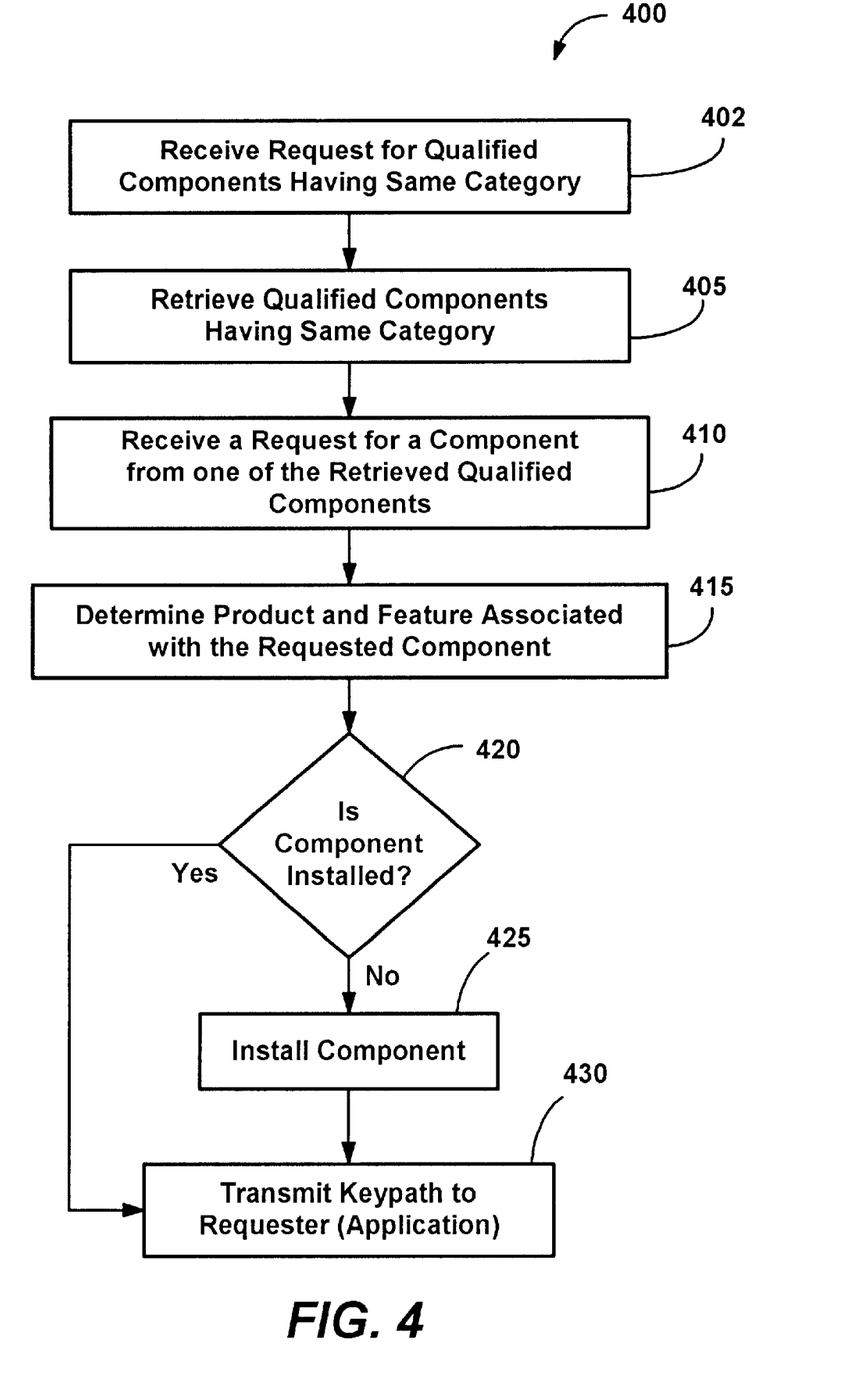
FIG. 4 is a flowchart depicting the steps involved with providing a keypath in response to an application requesting the keypath for a specific component in an embodiment of the present invention.

FIG. 4 is a flow chart depicting the steps involved with providing a keypath in response to an application requesting the keypath for a specific component in an embodiment of the present invention. The method 400 begins at step 402 where a request is received for qualified components all having the same category. As stated before, this request may come from an application 305 in order to present all the components that are related to a user. In one embodiment of the present invention, the application may request this by using the MsiEnumComponentQualifiers API, which is described above, and request all qualifiers from the Installer 201.

Following the reception of the request for qualified components, method 400 continues to step 405 where it retrieves all the qualified components having the same category. A category is a string that identifies related components. This string is associated with the components during the installation of the components by an installation application. To retrieve all the qualified components having the same category, the installer refers to the information received form the Published Component Table 245. It uses the category ID passed to it by the application and searches for all the features and components that contain an associated string that matches the category specified in the category ID. This procedure may be performed by the Installer 201 accessing the information received from the Published Component Table by receiving several calls and collecting all the components matching the string specified in the category ID at the same time and then passing the entire list to the application. Alternatively, it may be implemented by having the Installer search for a component that matches the string specified in the category ID and sending that component to the application. This approach requires the application to make additional calls until all the related components have been found.

In one embodiment of the present invention, a string, i.e., an AppData field, is associated with the component and this string is presented as the name of the token. This embodiment may be used when the identifier for the component does not convey its function. For example, if the component is identified as "1033" and it identifies an English language component, providing a string, not the category ID, allows the association of a more user-friendly term, such as "English Language" to be identified with the component. The AppData field may also be used as additional information that the application needs to properly select the component. For example, in the case where parameters may be parsed from the AppData field, the application may want to select the component having a specific qualifier as well as a specific parameter. Because it is preferable that the qualifier be unique, using the AppData field as additional parameter values provides more flexibility because the AppData field does not need to be unique and thus prevents overloading of the qualifier.

The application, having received all the components of the same category, then proceeds to select a specific component in which it needs the keypath. The reason the keypath is needed is that the application is required to know where the component is in order to execute the component. The keypath is stored within the Installer Registry 202. The Installer Registry associates a keypath with a token. A token is based on product, feature and component information. A token-keypath association will exist in the Installer Registry 202 for every component.

The method 400 then proceeds to step 410 where the Installer 201 then receives requests for a specific component. This request may come from the application 305. In one embodiment of the present invention, the application may have presented the list of components that were retrieved in step 405 to a user for selection. The user then may select one component from the list presented. The application presents the selection to the Installer so that the Installer can retrieve the keypath from the Installer Registry. The application locates the component using the keypath and then performs whatever function is associated with that component.

This request from the application may be performed by using the MsiProvideQualifiedComponent API, which is described above. After receiving the request for a specific component in step 410, the Installer 201 then proceeds to step 415 to determine the product and feature associated with that component. The feature associated with the component is known to the Installer when a search is performed on the information transferred from the Published Component Table 245, such as when the application 305 requested a list of components in step 402. When searching this Publish Component Table information to retrieve the list of components having the same category ID, the Installer 201 retrieved the feature associated with each component. This feature component association is maintained and the information is used when a request is received to find a specific component's keypath. In the event the previous request was not issued in step 402, it will be recognized by one skilled in the art that the present invention could then search the Publish Component Table 245 information to retrieve the associated feature information should it need to be obtained.

The present invention then proceeds to find the product associated with the feature and component, which have already been determined. As discussed earlier, the Descriptor 240 contains a product, feature and component triplet for each qualified component. These Descriptors were generated by the installation application during the initial installation. The Installer 201, using the feature and component information already retrieved, searches the Descriptors 240 to determine the product associated with the feature and component requested by the application 305. Once having received the product associated with the feature and component, the information can be used to find a matching token in the Installer Registry for the component received in the request received in step 410.

Method 400 then proceeds to step 420 where it detects to see if the keypath for the requested component is installed. If the component is not installed, then the method 400 proceeds to step 425 and then installs the component. The installation involved may proceed using the manner described in the discussion regarding FIG. 2. Following the installation of the component in step 425, method 400 proceeds to step 430 and provides the keypath where the component was installed by the installation application. In the event that in step 420 the component was already installed, then method 400 proceeds to step 430 and provides the keypath of where the component was installed to the application 305.

Figure 5:
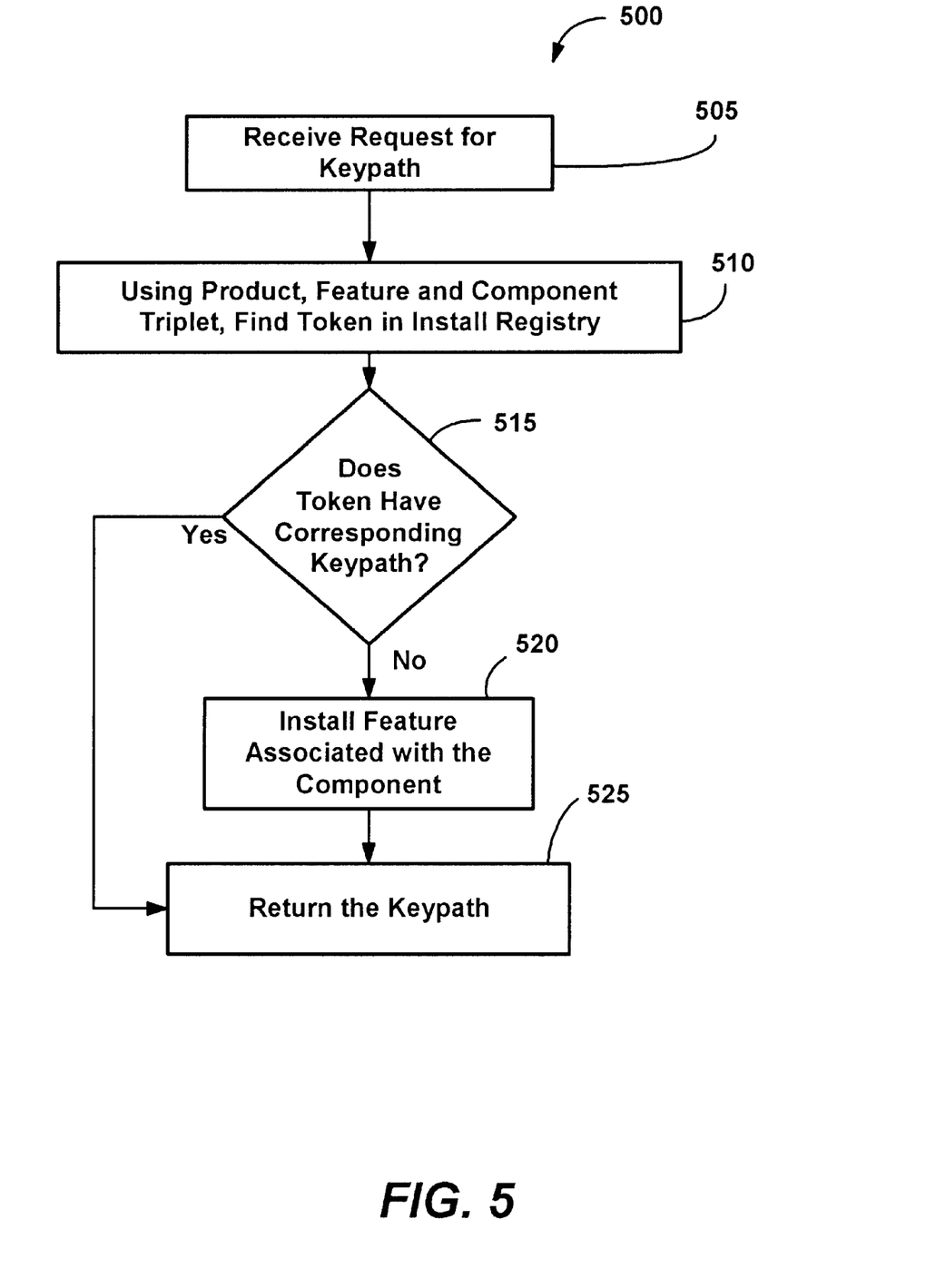
FIG. 5 is a flowchart depicting the steps involved with detecting whether a specific component is installed in an embodiment of the present invention.

FIG. 5 is a flow chart depicting the steps involved with detecting whether a specified component is installed. Beginning at step 505, the method 500 begins by receiving a request for a keypath for a component. As described above, this request may be received through an application 305 or may be initiated by an Installer 201 after the Installer receives the product, feature and component information from the transferred Published Component Table information and the Descriptors.

Proceeding to step 510, using the product, feature and component information as the token, the Installer Registry 202 is searched to determine whether the associated keypath for the requested component exists. Each product, feature and component triplet, i.e., the token, in the Installer Registry 202 will have a keypath associated with it. This keypath will be the location where the component is located. Using the token, the Installer Registry 202 is then searched to determine if a keypath exists for a given component.

In the event that a component was uninstalled or the keypath was somehow corrupted, the token may have had its associated keypath erased or otherwise deemed invalid. In the event that the keypath does not exist, or is deemed invalid, for the token, method 500 proceeds to step 520 where the component is installed. Because the component is not an installable unit unto itself, the feature, associated with the component is actually installed. The feature selected to install is determined as described with respect to FIG. 2, where the feature associated with the product in the office package 213 and office source 215 is used.

Once the feature is installed, thereby installing the components associated with the feature, the Installer Registry 202 is then updated with the keypath to the newly installed component. To update the Installer Registry, the token, representing the product, feature and component information, is found in the Installer Registry and the location of the newly installed component is placed in the keypath associated with the found token.

The method 500 then proceeds to step 525 where this keypath representing the location of the requested component is transmitted to the requesting module. In the event that in step 515 the keypath did exist initially in the Installer Registry, method 500 proceeds directly to step 525 where the keypath is returned, the keypath's existence confirming that it is installed and accessible.

In summary, the present invention is directed towards a generic way of publishing globally available functionality that can be shared across applications. The present invention utilizes an Installer Registry, an Installer, Descriptors and a Publish Component Table. Components that are related can be retrieved using a qualifier, established by the installation application, which identifies the related components. In one embodiment of the present invention, a request is received from an application for a listing of related components. The application includes a qualifier in the request that is used to identify the relation.

The Publish Component Table is populated by a product's author during the product's development. The information contained in the Publish Component Table is transferred to the Installer during the installation or "advertisement" of the product. The Installer, using the information transferred from the Publish Component Table, retrieves all the related components and presents them to the application. The application then selects a specific component. Receiving the selection, the installer determines the product associated with the component by using the feature and component information retrieved from the information transferred from the Publish Component Table. Once the product information is retrieved, the present invention searches the Installer Registry, using the product, feature and component information as a token, and determines whether a keypath exists for that token.

If the keypath for the token exists, then this keypath is returned to the application. If the keypath for the token does not exist, then the Installer installs the feature, and the associated component, and places the location, i.e., the keypath, of where the component was installed in the Installer Registry. This keypath is then returned to the application.

Alternative embodiments will become apparent to those skilled in the art to which the present invention pertains without departing from its spirit and scope. Accordingly, the scope of the present invention is described by the appended claims and is supported by the foregoing description.

What is claimed is:

1. A method of transmitting a keypath associated with a component to an application, wherein the keypath is the location where the component is installed, comprising the steps of:

receiving a request from the application for the keypath associated with the component;

searching an installation registry containing the component to determine whether the keypath associated with the component exists;

in the event the associated keypath exists, transmitting the keypath to the application; and in the event the associated keypath does not exist for the application, generating a keypath by establishing a smallest possible installable unit of the component, wherein the component is accessible by the application, and transmitting the generated keypath to the application.

2. The method of claim 1, wherein the step of receiving a request from an application comprises:

receiving a request from the application for a list of components having a specified criteria;

transmitting to the application the list of components matching the specified criteria; and receiving a request from the application for the keypath associated with the component selected from the list of components.

3. The method of claim 2, wherein the specified criteria includes a category associated with the component.

4. The method of claim 2, further comprising the steps of:

associating a character string for each component in the list of components; and transmitting each character string to the application along with the list of components matching the specified criteria.

5. The method of claim 1, wherein the step of establishing the component is performed by installing a feature associated with the component.

6. The method of claim 1, wherein the step of establishing the component is performed by configuring an existing component.

7. A method of transmitting a keypath associated with a component to an application, wherein the keypath is the location where the component is installed, comprising the steps of:

receiving a request from the application for a list of components having a specified criteria;

transmitting to the application the list of components matching the specified criteria;

receiving a request from the application for the keypath associated with one of the components contained in the list;

associating a product and a feature with the component;

searching an installation registry using the product, feature and component to find whether the keypath associated with the component exists;

in the event the associated keypath exists, transmitting the keypath to the application; and in the event the associated keypath does not exist for the application, generating a keypath by establishing a smallest possible installable unit of the component, wherein the component is accessible by the application, and transmitting the generated keypath to the application.

8. The method of claim 7, wherein the specified criteria includes a category associated with the component.

9. The method of claim 7, wherein the step of establishing the component is performed by installing a feature associated with the component.

10. The method of claim 7, further comprising the steps of:

associating a character string for each component in the list of components; and transmitting each character string to the application along with the list of components matching the specified criteria.

11. The method of claim 7, wherein the step of establishing the component is performed by configuring an existing component.

12. A method of transmitting a keypath associated with a component to an application, wherein the keypath is the location where the component is installed, comprising the steps of:

receiving a request for the keypath;

retrieving a feature associated with the component from a table;

retrieving a product associated with the feature and the component from a descriptor table, wherein the descriptor table associates related products, features and components;

searching a registry to determine whether a keypath exists for the component associated with the feature and product;

in the event the associated keypath exists, transmitting the keypath to the application; and in the event the associated keypath does not exist for the application, generating a keypath by establishing a smallest possible installable unit of the component, wherein the component is accessible by the application, and transmitting the generated keypath to the application.

13. The method of claim 12, wherein the step of receiving a request from an application comprises:

receiving a request from the application for a list of components having a specified criteria;

transmitting to the application the list of components matching the specified criteria; and receiving a request from the application for the keypath associated with the component selected from the list of components.

14. The method of claim 13, further comprising the steps of:

associating a character string for each component in the list of components; and transmitting each character string to the application along with the list of components matching the specified criteria.

15. The method of claim 13, wherein the specified criteria includes a category associated with the component.

16. The method of claim 12, wherein the step of establishing the component is performed by installing a feature associated with the component.

17. The method of claim 12, wherein the table is a Publish Component Table.

18. The method of claim 12, wherein the registry is an Installer Registry.

19. The method of claim 12, wherein the step of establishing the component is performed by configuring an existing component.

20. A method of communicating between an application and an installer in a computer system, comprising the steps of:

issuing, by the application, a provide qualified component call having a plurality of call parameters comprising a category ID and a qualifier, wherein the category ID indicates a common function among software components, the software components identifying a collection of resources that are installed or uninstalled as a unit;

receiving, by the installer, the provide qualified component call and parsing the call to retrieve the parameters, wherein, upon reception of the provide qualified component call, the installer is operative to return a location of a component associated with the category ID and the qualifier; and issuing, by the installer, a provide qualified component acknowledgment having a plurality of parameters comprising the category ID and the qualifier.

21. A method of communicating between an application and an installer in a computer system, comprising the steps of:

issuing, by the application, an enumerate component qualifiers call having a plurality of call parameters comprising a category ID and a qualifier, wherein the category ID indicates a common function among software components, the software components identifying a collection of resources that are installed or uninstalled as a unit;

receiving, by the installer, the enumerate component qualifiers call and parsing the call to retrieve the parameters, wherein, upon reception of the enumerate component qualifiers call, the installer process is operative to return a component matching the qualifier parameter; and issuing, by the installer, an enumerate component qualifiers acknowledgment having a plurality of parameters comprising the category ID and the qualifier.

22. The method of claim 21, wherein the enumerate component qualifiers further comprises an AppData parameter that associates a string to the category ID.

* * * * *